United States Patent
Sonnier

(10) Patent No.: US 9,154,421 B2
(45) Date of Patent: Oct. 6, 2015

(54) NETWORK BASED DATA TRAFFIC DETECTION AND CONTROL

(75) Inventor: David P. Sonnier, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 2879 days.

(21) Appl. No.: 11/443,393

(22) Filed: May 30, 2006

(65) Prior Publication Data

US 2007/0280125 A1   Dec. 6, 2007

(51) Int. Cl.
| H04L 12/54 | (2013.01) |
| H04L 12/801 | (2013.01) |
| H04L 12/813 | (2013.01) |
| H04L 12/815 | (2013.01) |
| H04L 12/853 | (2013.01) |
| H04L 12/851 | (2013.01) |
| H04L 12/841 | (2013.01) |
| H04L 12/24 | (2006.01) |
| H04L 12/26 | (2006.01) |

(52) U.S. Cl.
CPC .............. *H04L 47/10* (2013.01); *H04L 41/142* (2013.01); *H04L 43/0852* (2013.01); *H04L 47/20* (2013.01); *H04L 47/22* (2013.01); *H04L 47/2416* (2013.01); *H04L 47/2441* (2013.01); *H04L 47/283* (2013.01)

(58) Field of Classification Search
USPC .............. 370/229, 230, 230.1, 235, 238, 252, 370/253, 389, 395.4, 412–418, 428, 429, 370/501, 508
See application file for complete search history.

(56) References Cited

U.S. PATENT DOCUMENTS

| 6,049,547 A * | 4/2000 | Fisher et al. .................. 370/412 |
| 6,501,733 B1 * | 12/2002 | Falco et al. .................... 370/235 |
| 6,751,194 B1 * | 6/2004 | Ueno ............................. 370/235 |
| 6,789,116 B1 | 9/2004 | Sarkissian et al. |
| 2002/0172153 A1 * | 11/2002 | Vernon ......................... 370/229 |

(Continued)

FOREIGN PATENT DOCUMENTS

| EP | 1107509 | 6/2001 |
| EP | 1335556 A1 | 8/2003 |

(Continued)

OTHER PUBLICATIONS

P. Grant et al., "Phone, Cable Firms Rein in Consumers' Internet Use," The Wall Street Journal Online, 4 pages, Oct. 21, 2005.

(Continued)

*Primary Examiner* — Ricky Ngo
*Assistant Examiner* — Wei-Po Kao
(74) *Attorney, Agent, or Firm* — Schwabe, Williamson & Wyatt, P.C.

(57) ABSTRACT

A network-based apparatus for imposing a minimum transmit latency on data packets of a prescribed data type on a network includes at least one processor. The processor is operative: (i) to receive a data packet of the prescribed data type; (ii) to determine an elapsed time since an arrival of the received data packet at the apparatus; (iii) when the elapsed time is equal to or greater than the minimum transmit latency, to transmit the data packet; and (iv) when the elapsed time is less than the minimum transmit latency, to wait an amount of time at least equal to a difference between the elapsed time and the minimum transmit latency and then to transmit the data packet. The apparatus further includes memory coupled to the processor, the memory being configurable for storing data utilized by the processor.

16 Claims, 3 Drawing Sheets

(56) References Cited

U.S. PATENT DOCUMENTS

| | | | |
|---|---|---|---|
| 2004/0073946 A1* | 4/2004 | Kobayashi | 725/132 |
| 2004/0100906 A1* | 5/2004 | Gay | 370/235 |
| 2005/0163047 A1* | 7/2005 | McGregor et al. | 370/229 |
| 2005/0169173 A1* | 8/2005 | Mahdavi | 370/230 |
| 2006/0133428 A1 | 6/2006 | Guthrie et al. | |
| 2006/0268696 A1* | 11/2006 | Konstantinov et al. | 370/229 |
| 2007/0002740 A1* | 1/2007 | Evans et al. | 370/230.1 |

FOREIGN PATENT DOCUMENTS

| | | |
|---|---|---|
| GB | 0819301.3 | 1/2011 |
| JP | 2009513342 A | 4/2009 |
| KR | 20060044237 A | 5/2006 |
| WO | 02/19634 | 3/2002 |
| WO | PCT/US2007/062639 | 8/2007 |

OTHER PUBLICATIONS

A. Estepa et al., "A New Approach for VoIP Traffic Characterization," IEEE Communications Letters, vol. 8, No. 10, pp. 644-646, Oct. 2004.

R. Estepa et al., "Background Noise Influence on VoIP Traffic Profile," MIPS 2004, LNCS 3311, pp. 13-24, 2004.

H. Chunhua et al., "A Protocol Independent Policer and Shaper Design Using Virtual Scheduling Algorithm," Communications, Circuits and Systems, IEEE, Jun. 2002, pp. 791-795.

J-S. Wu et al., "Architecture of Multi-Connection Shaper and Enforcer Based on Time-Differential Generic Cell Rate Algorithm (GCRA)," Global Telecommunications Conference, IEEE, Nov. 1995, pp. 621-626.

* cited by examiner

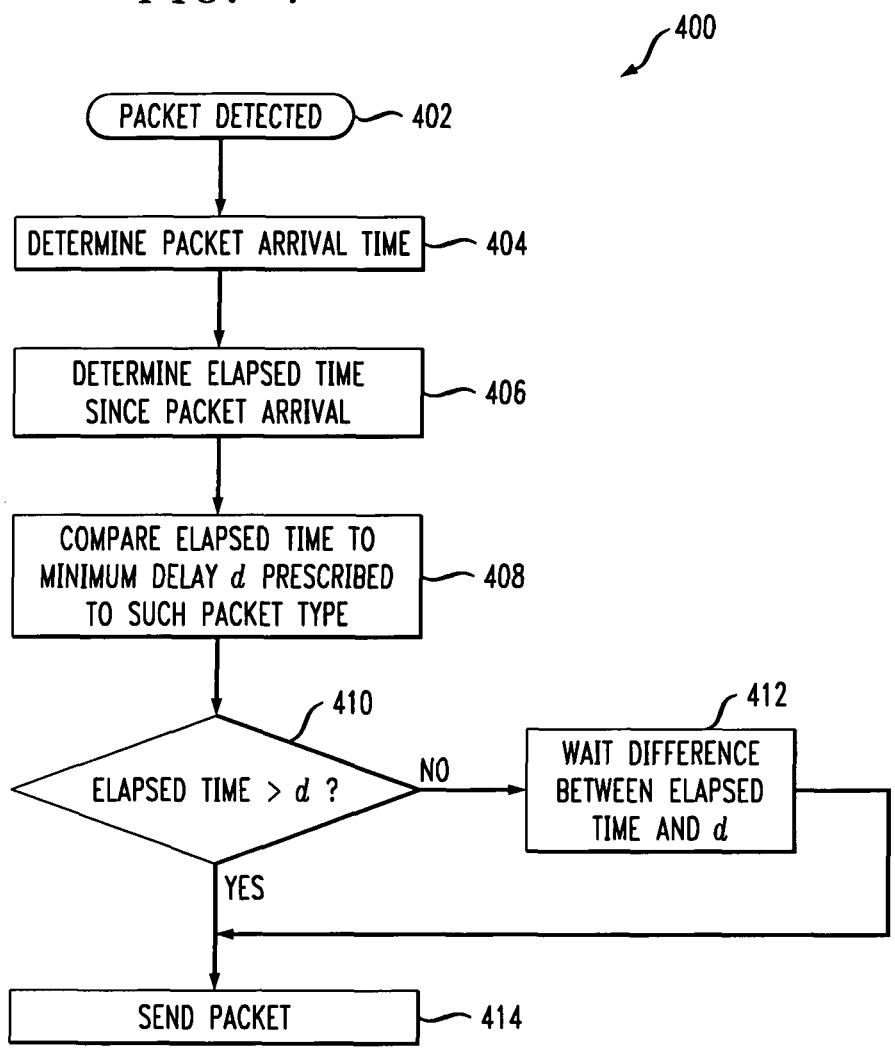

NETWORK BASED DATA TRAFFIC DETECTION AND CONTROL

FIELD OF THE INVENTION

The present invention relates generally to data communications, and more particularly relates to techniques for detecting and controlling data traffic over a network.

BACKGROUND OF THE INVENTION

As technology continues to advance in data communications over a network, such as, for example, the Internet, the manner in which such a network is used continues to evolve. For example, the Internet has traditionally been used primarily for relatively low-bandwidth, latency-tolerant data traffic such as electronic mail (email) communications, document searching and retrieval. More recently however, as the bandwidth of network channels increases and as network data transmission rates increase, the Internet is being used to provide such services as multimedia streaming, Voice over Internet Protocol (VoIP), sometimes referred to as Internet calling, Internet Protocol television (IPTV), etc., which, due to the extensive bandwidth requirements of such services, had not previously been achievable using a network communication medium.

Network service providers (NSPs) find it highly desirable to be able to control certain types of data traffic being transmitted over their networks (e.g., VoIP traffic) so as to make it harder for consumers to use the Internet for phone calls or for swapping multimedia files. As stated in the article "Phone, Cable Firms Rein In Consumers' Internet Use," by Peter Grant and Jesse Drucker, Wall Street Journal Online, pp. 1-4 (Oct. 21, 2005), which is incorporated by reference herein, these network service providers contend that such consumers are taking up too much space on networks and slowing down service for all customers that tap the Internet for email, video, music, phone and other services. Many network service providers stipulate in their subscription agreements that customers may not use the company's high-speed Web-access networks for Internet calling purposes. Several cable companies are using technology to cap the speed at which some of their customers are able to swap multimedia files (e.g., video).

Conventional solutions to the problem of controlling the flow of specific types of network traffic have, thus far, been unsuccessful or prohibitively expensive. Unfortunately, consumers have come to expect unfettered use of the Internet, and therefore any efforts by network service providers to control certain types of network traffic have been met with much resistance. One approach for controlling network traffic is for the network service provider to impose bandwidth limitations. This approach, however, is undesirable in that such bandwidth limitations applied to all types of network traffic can make a network service provider less competitive and, in addition, does very little to block VoIP traffic which is characteristically not high bandwidth. Another known approach is detecting specific traffic types using deep packet inspection (DPI) and then blocking or rate-limiting the specific traffic type detected. However, DPI only works for non-encrypted data traffic and it would be easy to defeat simply by having the VoIP traffic, or other traffic type, masquerade, for example, as Secure Sockets Layer (SSL) encrypted web traffic. Moreover, blocking specific types of data traffic may have certain legal implications for the network service provider which, in accordance with most service provider contracts, must typically guarantee a certain minimum bandwidth. Furthermore, rate-limiting will have little effect on VoIP traffic since, as previously explained, VoIP traffic is not bandwidth intensive.

Accordingly, there exists a need for improved techniques for detecting specific types of network traffic and for controlling the flow of such network traffic, which do not suffer from one or more of the problems exhibited by conventional network traffic detection and control methodologies.

SUMMARY OF THE INVENTION

The present invention meets the above-noted need by providing, in illustrative embodiments thereof, techniques for detecting and/or controlling data traffic of a specified type on a network.

In accordance with one aspect of the invention, a network-based apparatus for imposing at least a prescribed minimum transmit latency on data packets of a specified data type on a network includes at least one processor. The processor is operative: (i) to receive a data packet of the prescribed data type; (ii) to determine an elapsed time since an arrival of the received data packet at the apparatus; (iii) when the elapsed time is equal to or greater than the minimum transmit latency, to transmit the data packet; (iv) when the elapsed time is less than the minimum transmit latency, to wait an amount of time at least equal to a difference between the elapsed time and the minimum transmit latency and then to transmit the data packet. The apparatus further includes memory coupled to the at least one processor, the memory being configurable for storing data utilized by the processor.

In order to identify data packets of the prescribed data type, the system may further include a measurement circuit and a comparator coupled to the measurement circuit. The measurement circuit is adapted to receive a packet stream, to measure one or more characteristics of the packet stream in accordance with criteria supplied to the measurement circuit, and to generate an output indicative of respective values of the measured characteristics. The comparator is adapted to compare the output generated by the measurement circuit with corresponding expected values of the measured characteristics associated with the prescribed data type, and to generate an output characterizing whether the packet stream comprises data packets of the prescribed data type as a function of whether the output generated by the measurement circuit substantially matches the corresponding expected values of the measured characteristics associated with the prescribed data type.

In controlling data traffic on the network, a prescribed minimum transmit latency is imposed on at least a certain percentage of data packets of the specified type, in accordance with another aspect of the invention. The packet stream may be characterized as comprising data packet of a specified type by performing pattern analysis based at least in part on a comparison of certain measured criteria with expected values of the measured criteria associated with the specified data type. In this manner, the data traffic can be identified to a high probability as comprising relevant packets without inspecting the contents of the individual data packets.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 depicts an exemplary method for controlling network traffic by imposing a minimum transmit latency on data packets associated with a relevant type of network traffic, in accordance with an embodiment of the invention.

DETAILED DESCRIPTION OF THE INVENTION

The present invention will be illustrated herein in conjunction with an exemplary network-based communication system and methodologies for detecting VoIP traffic and/or controlling VoIP traffic on a network. The communication system includes a link layer device (LLD), a physical layer device (PLD), and other elements configured in a particular manner. It should be understood, however, that the invention is not limited to this or any particular communication system, nor is the invention limited to detecting or controlling VoIP traffic. Rather, the invention is more generally applicable to any system in which it is desirable to detect a specific type of network traffic based on prescribed recognizable characteristics associated with the specific traffic type, and/or to control the flow of a specific type of network traffic in a network by imposing at least a prescribed minimum transmit latency restriction on the specific traffic type.

Figure 1:
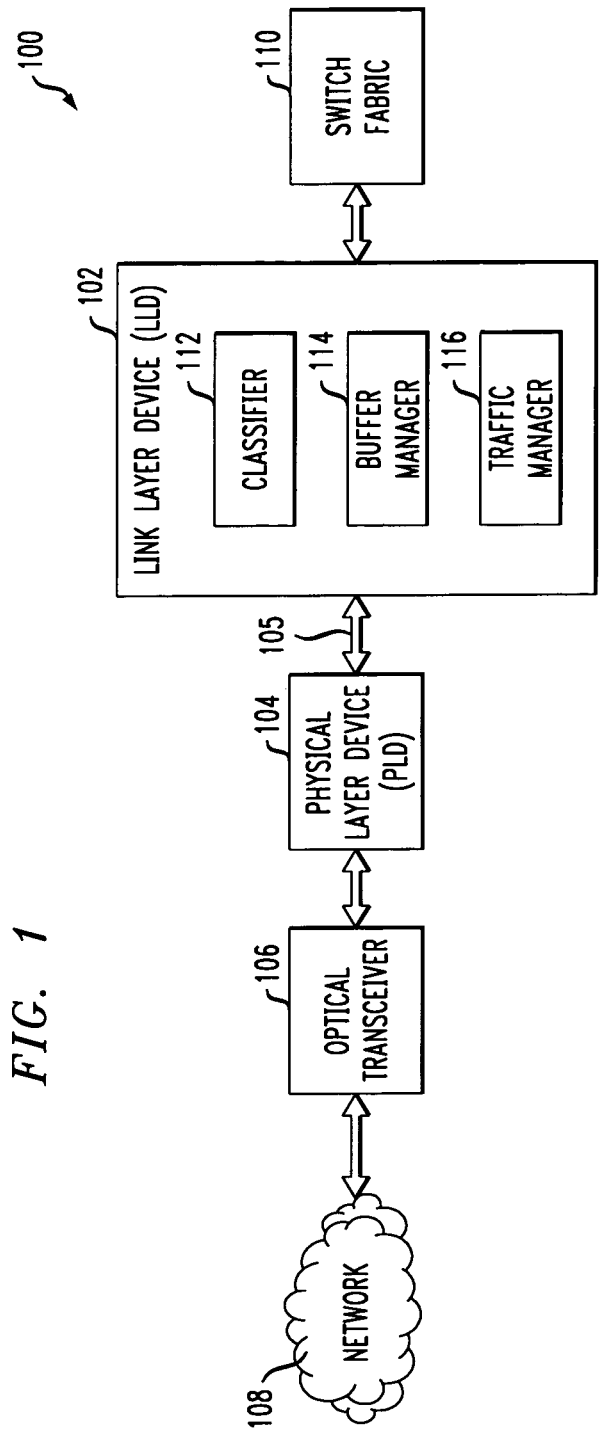
FIG. 1 is a block diagram depicting at least a portion of an illustrative network-based communication system in which techniques of the present invention are implemented.

FIG. 1 shows an illustrative network-based communication system 100 in which the invention is implemented. The system 100 includes a LLD 102 coupled to a PLD 104 via an interface 105. The PLD 104 is coupled via an optical transceiver 106, or an alternative data transmission arrangement, to a network 108 (e.g., the Internet). The LLD 102 is coupled to switch fabric 110. The LLD is configured to communicate packets, cells or other protocol data units (PDUs) between the network 108 and switch fabric 110 which controls switching of PDU data. The PLD 104 and optical transceiver 106 function to interface the LLD 102 to physical transmission media of the network 108, which are assumed in this case to comprise optical transmission media.

A "link layer device" or LLD as the term is used herein refers generally to a network processor or other type of processor which performs processing operations associated with a link layer of a network-based system. Such a device may be implemented, by way of example only and without limitation, utilizing a microprocessor, central processing unit (CPU), digital signal processor (DSP), application-specific integrated circuit (ASIC), or other type of data processing device, as well as portions or combinations of these and other devices. The LLD 102 may comprise, for example, a network processor such as a PayloadPlus® (a registered trademark of Agere Systems Inc.) network processor in the APP500 or APP300 product family, commercially available from Agere Systems Inc. of Allentown, Pa., U.S.A.

A "physical layer device" of PLD as the term is used herein refers generally to a device which provides an interface between a link layer device and a physical transmission medium of a network-based system. The PLD 104 may comprise one or more devices suitable for providing access termination and aggregation for multiples services, or any other physical layer device of a type known to those skilled in the art.

It is to be appreciated that the invention is not limited to use with any particular type of LLD or PLD. Numerous such devices suitable for use with the present invention are well known to those skilled in the art. The conventional aspects of these devices will therefore not be described in detail herein.

The LLD 102 as depicted in FIG. 1 includes a classifier 112, a buffer manager 114, and a traffic manager 116. Such elements may be implemented as otherwise conventional network processor elements of a type known to those skilled in the art, suitably modified to incorporate traffic type detection and/or traffic control techniques of the present invention. The LLD 102 will also generally include other elements of a type commonly found in a network processor or other type of LLD. For example, LLD 102 will typically include an internal memory, as well as an interface to an external memory. Such memory elements may be utilized for implementing PDU buffer memory, queuing and dispatch buffer memory, etc. The LLD 102 may further include one or more memory controllers, as well as appropriate interface circuitry for interfacing with the PLD 104, the switch fabric 110, and other external devices.

The PLD 104 may comprise a plurality of queues, including ingress queues and egress queues, as well as appropriate interface circuitry for interfacing with the LLD 102 and the optical transceiver 106. In other embodiments, the optical transceiver 106 may be implemented within the PLD itself, such that the PLD interfaces directly with the network 108. Moreover, it is possible that the PLD and the LLD may be integrated together into a single device, such as an ASIC. The terms PLD and LLD as used herein should therefore be understood to include any set of one or more functional components which perform respective PLD and LLD operations in a single device.

A channel in the following description will be assumed to refer generally to a logical channel (e.g., digital signal 0 (DS0) channel), which may include a wireless communication link, such as, for example, cellular, radio frequency (RF), infrared (IR), microwave, satellite, etc., and may also include a dedicated communication line, such as, for example, telephone, cable, fiber optic, etc. A channel may have a certain data rate associated therewith which determines how many samples per second can be transmitted on that particular media. Lower rate channels can be aggregated into a single higher rate channel by using, for example, multiplexers, as will be understood by those skilled in the art. Likewise, lower rate channels can be extracted from a higher rate channel by using, for example, demultiplexers. A single physical link may carry a number of logical channels. A link in the illustrative embodiments may be, for example, a digital signal 1 (DS1) link comprising 24 DS0 channels and having a data rate of 1.544 megabits per second (Mbps), or an E1 link comprising 32 DS0 channels and having a data rate of 2.048 Mbps.

Figure 2:
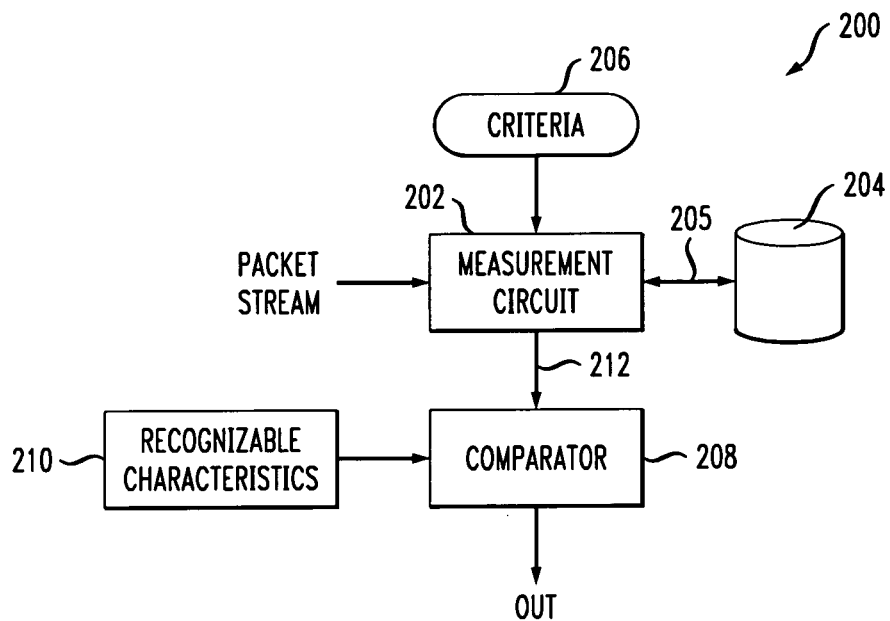
FIG. 2 is a block diagram depicting at least a portion of an exemplary network-based data traffic pattern detection system for detecting a particular type of data traffic on a network, in accordance with an embodiment of the invention.

FIG. 2 is a block diagram depicting at least a portion of an exemplary network-based data traffic pattern detection system 200 for detecting a particular type of data traffic on a network, in accordance with an embodiment of the invention. The system 200 includes a measurement circuit 202 coupled to memory 204 via a bus 205, or an alternative connection arrangement. The measurement circuit 202 is coupled to a criteria block 206 which is preferably configured to provide certain properties of the incoming data traffic to be measured. The measurement circuit 202 is also coupled to a comparator 208 which is configured to receive prescribed recognizable characteristics 210 corresponding to the particular traffic type to be detected.

In the context of detecting VoIP traffic on a network, it can be shown that VoIP traffic has a distinctive pattern associated therewith which is necessary for providing acceptable communication quality. This VoIP traffic pattern, which comprises human speech, can be easily recognized by measuring one or more characteristics of a packet stream. Human speech consists predominantly of talk spurts and silence gaps, also known as on-off patterns. The presence of spurts and gaps allows for silence suppression, where a voice segment is transmitted only if it is detected as active (e.g., a talk spurt). Silence suppression is often done as a means of saving network bandwidth.

Typically, VoIP traffic comprises multiple data packets that are relatively small in size (e.g., about 50 to 150 bytes) and have a relatively low data rate (e.g., about 64 kilobits per second (Kbps)) associated therewith. During voice communication, the packets are being sent at a substantially constant rate, such as, for example, about 20 milliseconds (ms) between packets, separated by gaps (e.g., silence suppression). Thus, VoIP traffic generally comprises multiple small packets, substantially evenly spaced, transmitted in bursts lasting about one or more seconds in duration. Since the detection of the relevant traffic employs only the inherent pattern (e.g., profile) of the packets and does not inspect the contents of the individual packets, it is significantly more likely to successfully detect the relevant traffic and considerably more difficult to fool. Moreover, detecting relevant traffic using the pattern analysis approach of embodiments of the present invention is less costly than inspecting every byte of the packet, as is done in conventional traffic detection schemes.

In accordance with one aspect of the invention, the measurement circuit 202 in the traffic pattern detection system 200 is preferably configured to receive an incoming packet stream and to measure certain characteristics of the packet stream using criteria 206 supplied thereto. The criteria 206 may comprise, for example, bit rate, packet size, inter-packet gap size, average and standard deviation of packets, and other statistical analyses determinative of the particular traffic type to be detected. The criteria 206 thus serves as a filter to restrict which properties of the packet stream are to be measured. Memory 204 coupled to the measurement circuit 202 may be used to store historical data relating to the packet stream, although the memory may be used to store other information and/or computational results relating to the packets as well. The data stored in memory 204 may be beneficial for determining, for example, the spatial distribution of packets (e.g., inter-packet delay), average and standard deviation of relevant traffic, statistical analysis of relevant traffic, etc. The measurement circuit 202 generates an output 212 indicative of a value of the measured quantity. One or more characteristics of the packet stream may be measured by the measurement circuit 202.

The comparator 208 is preferably configured to receive the output 212 generated by the measurement circuit 202 and to compare the value of each measured quantity to corresponding prescribed recognizable characteristics 210 associated with the relevant traffic type to be detected. The recognizable characteristics 210 may comprise, for example, an expected value, or a range of values, for each of the criteria 206 corresponding to the particular type of traffic to be detected. For instance, in the case of identifying VoIP traffic, the recognizable characteristics 210 may comprise a range of packet sizes (e.g., about 50 to 150 bytes), a bit rate (e.g., about 64 Kbps), and/or an inter-packet gap size (e.g., about 20 ms). The comparator 208 generates an output signal, OUT, indicative of whether or not the value of the measured characteristic substantially matches the expected value corresponding to that characteristic, which can be used to discern whether or not the detected traffic is likely the relevant traffic type. A fuzzy logic implementation would be well-suited in performing this comparison, although alternative comparison methodologies are similarly contemplated by the invention.

The probability of correctly identifying a specific type of traffic will depend upon the number of criteria used in the recognition process. As the number of criteria used increases, the likelihood of correctly identifying the specific type of traffic increases accordingly. Since the detection of relevant traffic using the pattern recognition approach of the present invention cannot be guaranteed, the possibility of generating a "false positive," where the traffic is determined to be the desired type when in fact it is not, is a non-zero quantity. However, most other types of data traffic on the network, including without limitation web browsing and even video streaming, is not as latency sensitive as VoIP traffic, and therefore imposing a prescribed minimum transmit latency will essentially have no meaningful impact on such erroneously identified traffic. While latency can affect performance for certain other applications, including, for example, certain types of web browsing, these other applications are generally more sensitive to average latency. VoIP traffic, however, is highly sensitive to instantaneous latency.

It is to be understood that although embodiments of the invention are described herein in the context of detecting VoIP data traffic on a network, the techniques of the invention may be similarly used to detect essentially any type of data traffic having a recognizable traffic pattern associated therewith.

Figure 3:
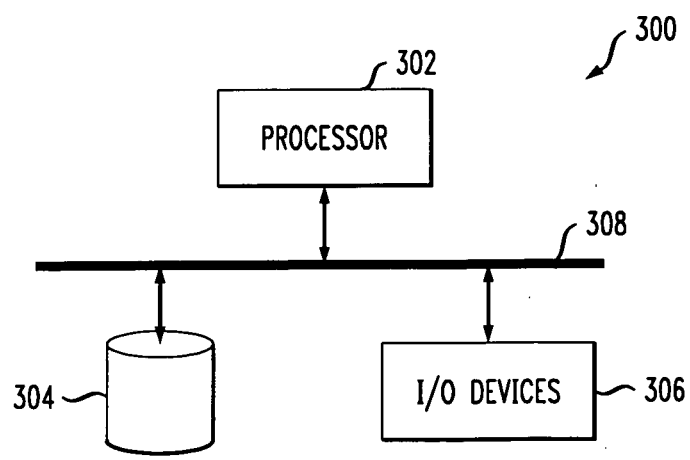
FIG. 3 depicts a data processing system in which techniques of the present invention are implemented.

FIG. 3 shows a data processing system 300 in which the data traffic detection techniques of the invention can be implemented. The system 300 includes a processor 302, memory 304, and input/output (I/O) devices 306, coupled together via a bus 308, or an alternative connection arrangement. It is to be appreciated that the term "processor" as used herein is intended to include without limitation any processing device, state machine, etc., such as, for example, one that includes a central processing unit (CPU) and/or other data processing circuitry. Moreover, the term "processor" may refer to more than one processing device, and various elements associated with a processing device may be shared by other processing devices. The term "memory" as used herein is intended to include without limitation memory associated with a processor or CPU, such as, for example, registers, random access memory (RAM), read-only memory (ROM), flash memory, etc. Such memory may be implemented in a single device, or portions of the memory may be implemented using a plurality of devices, such as in a distribution fashion. The memory may be configurable for storing data utilized by the processor. The term "I/O devices" as used herein is intended to refer to devices and/or system components configurable for presenting data to the processor and/or for indicating computational results of the processor. The term "I/O devices" as used herein is intended to include without limitation one or more input devices or system components (e.g., keyboard, mouse, etc.) for entering data to the processor, and/or one or more output devices or system components (e.g., monitor, etc.) for presenting computational results associated with the processor.

In accordance with other aspects of the present invention, one or more particular types of data traffic on the network may be controlled by imposing a prescribed minimum transmit latency on data packets of the particular traffic type(s). In a VoIP application, which is highly sensitive to instantaneous latency, VoIP traffic can be severely disrupted simply by imposing sufficient delay on data packets of a relevant type of network traffic or on a prescribed percentage of the data packets. For example, imposing the prescribed minimum transmit latency on only about five percent of VoIP packets can degrade the quality of a voice conversation to the point that the conversation is essentially unintelligible, and yet it would have relatively little effect on web browsing. Any delay greater than about a few hundred milliseconds, for example, will degrade overall voice call quality sufficiently to achieve a network service provider's objective of increasing revenue, either by having customers pay for premium Internet service or by having customers obtain Internet calling services through the network service provider rather than though third party Internet calling services.

The imposition of at least a prescribed minimum latency on relevant data packets can be implemented by a programmable shaping function, such as, for example, using a network processor device (e.g., Agere APP300 or APP500 series), or by an alternative delay arrangement. It is to be appreciated that the amount of latency imposed on such data packets of the specified type is not limited to any particular value. Nor is the invention limited to a specific percentage of the data packets to which the prescribed minimum transmit latency is imposed.

FIG. 4 shows an exemplary method 400 for controlling network traffic by imposing a prescribed minimum transmit latency on data packets associated with a relevant type of network traffic, in accordance with an embodiment of the invention. It is to be understood that the invention is not limited to the method shown, nor is the invention limited to imposing a minimum latency on packets of a prescribed data type. The methodology 400 may be implemented in accordance with a data processing system, such as, for example, the illustrative data processing system 300 shown in FIG. 3, or an alternative system. In the exemplary methodology 400 for controlling network traffic, it is assumed that a mechanism is employed (e.g., network-based data traffic pattern detection system 200 shown in FIG. 2) for detecting a particular type of data traffic on the network. The method 400 is preferably initiated when a data packet of the relevant type is detected in step 402. When the packet is detected, its arrival time is determined in step 404 and may be stored for subsequent processing.

In order to impose a prescribed minimum transmit delay d on the packet, the received packet is preferably held (e.g., in temporary storage) for at least an amount of time equal to the delay d prior to being re-transmitted. To accomplish this, an elapsed time since the packet arrival is measured in step 406. The elapsed time since the packet arrival is then compared to the minimum delay d in step 408. The result of the comparison is evaluated in step 410. When the elapsed time is less than the prescribed minimum delay d for the packet, the packet is held in step 412 for a time at least equal to the remainder of the difference between the elapsed time and the minimum delay d until the packet is sent in step 414. When the elapsed time is equal to or greater than the prescribed minimum delay d, as evaluated in step 410, flow control proceeds to step 414 where the packet is sent.

By way of example and without loss of generality, consider a detected VoIP packet which arrives at time t0 and assume it is desirable to impose a prescribed minimum transmit delay of 100 ms on all VoIP packets on a network. If the elapsed time since arrival of the packet is determined to be 50 ms, the illustrative methodology 400 would wait another 50 ms before sending out the packet. If, on the other hand, the elapsed time since arrival of the packet is determined to be 150 ms, the illustrative method 400 would send the packet without imposing any further delay, since the minimum delay period has already been met. Packets may be delayed due to congestion (e.g., too many packets being transmitted on a given interface), processing delay (e.g., in classifying the packet), or because a preceding packet in the same queue was already subjected to the minimum latency, among other factors. Thus, the prescribed delay imposed on incoming packets is not necessarily a constant delay, but rather is a guaranteed minimum delay (e.g., a minimum delay threshold).

It is to be appreciated that various alternative methodologies for controlling network data traffic of packets are contemplated by the invention. For example, in accordance with other embodiments of the invention it may desirable to impose a prescribed minimum transmit latency on a certain percentage (e.g., about ten percent) of relevant packets rather than on all packets of a prescribed data type (e.g., VoIP). In the context of VoIP, since VoIP traffic is highly latency sensitive, if a certain percentage of packets are delayed there can be dropped words or dropped calls altogether, which would result in a substantially lower quality of service. One benefit of delaying only a percentage of relevant data packets is that the amount of storage required to hold all packets for the minimum delay period, as well as the corresponding overhead associated therewith, would be significantly reduced.

The network traffic detection and/or control techniques of the present invention may be implemented essentially anywhere in the network, preferably by a processor (e.g., network processor) or other processing circuitry. However, it may be advantageous to implement such techniques closer to edges of the network, preferably closest to the subscribing customer, such as, for example, in a carrier portion of the network. In this manner, the number of sessions and corresponding data traffic that need to be monitored will be substantially lower compared to an implementation which is more centrally located (e.g., network server) which must monitor a high number of sessions. In a digital subscriber line (DSL) application, it is preferable to implement the network traffic detection and/or control techniques of the present invention near a digital subscriber line access multiplexer (DSLAM).

At least a portion of the network traffic detection and/or control methodologies of the present invention may be implemented in one or more integrated circuits. In forming integrated circuits, a plurality of identical die is typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A network-based apparatus for imposing at least a prescribed minimum transit latency on data packets of a prescribed data type on a network, the apparatus comprising:
at least one processor operative: (i) to receive a data packet of the prescribed data type; (ii) to determine an elapsed time since an arrival of the received data packet at the apparatus; (iii) when the elapsed time is equal to or greater than the prescribed minimum transit latency, to transmit the data packet; and (iv) when the elapsed time is less than the prescribed minimum transit latency, to wait an amount of time at least equal to a difference between the elapsed time and the prescribed minimum transit latency and then to transmit the data packet, thereby ensuring that the data packet is transmitted with a latency greater than or equal to the prescribed minimum transmit latency;

memory coupled to the at least one processor, the memory being configurable for storing data utilized by the at least one processor; and circuitry operative to receive a packet stream and to detect whether the packet stream comprises the data packets of the prescribed data type based on a traffic pattern analysis of the packet stream;

wherein the minimum transit latency is imposed only on a specified percentage of the data packets of the prescribed data type, said specified percentage of the data packets of the prescribed data type being less than all of the data packets of the prescribed data type.

2. The apparatus of claim 1, wherein the at least one processor, in conjunction with the step of determining the elapsed time since arrival of the received data packet, is operative to determine an arrival time of the received data packet, the elapsed time being determined relative to the arrival time of the data packet.

3. The apparatus of claim 1, wherein the at least one processor, in conjunction with the step of waiting an amount of time at least equal to the difference between the elapsed time and the prescribed minimum transit latency, is operative to store the received data packet at least until the elapsed time since the arrival of the data packet is equal to or greater than the minimum transit latency.

4. The apparatus of claim 1, wherein the circuitry comprises:
a measurement circuit operative to receive the packet stream, to measure one or more traffic pattern characteristics of the packet stream in accordance with criteria supplied to the measurement circuit, and to generate an output indicative of respective values of the one or more measured traffic pattern characteristics; and
a comparator coupled to the measurement circuit, the comparator being operative to compare the output generated by the measurement circuit with corresponding expected values of the one or more measured traffic pattern characteristics associated with the prescribed data type, and to generate an output characterizing whether the packet stream comprises data packets of the prescribed data type as a function of whether the output generated by the measurement circuit substantially matches the corresponding expected values of the one or more measured traffic pattern characteristics associated with the prescribed data type.

5. The apparatus of claim 4, wherein the criteria supplied to the measurement circuit is based at least in part on a statistical analysis of data traffic patterns of the prescribed data type.

6. The apparatus of claim 4, wherein the criteria supplied to the measurement circuit comprises at least one of a distribution of packet sizes, inter-packet delay distribution, and bit rate.

7. The apparatus of claim 4, wherein the measurement circuit is operative to measure at least one of a bit rate and a spatial distribution of the data packets in the packet stream.

8. The apparatus of claim 1, wherein the prescribed data type comprises a Voice over Internet Protocol data type.

9. The apparatus of claim 1, wherein the minimum transit latency imposed on the specified percentage of the data packets of the prescribed data type is greater than about 100 milliseconds.

10. An integrated circuit including at least one apparatus for imposing at least a prescribed minimum transit latency on data packets of a prescribed data type on a network, the at least one apparatus comprising:
at least one processor operative: (i) to receive a data packet of the prescribed data type; (ii) to determine an elapsed time since an arrival of the received data packet at the at least one apparatus; (iii) when the elapsed time is equal to or greater than the prescribed minimum transit latency, to transmit the data packet; and (iv) when the elapsed time is less than the prescribed minimum transit latency, to wait an amount of time at least equal to a difference between the elapsed time and the prescribed minimum transit latency and then to transmit the data packet, thereby ensuring that the data packet is transmitted with a latency greater than or equal to the prescribed minimum transmit latency;

memory coupled to the at least one processor, the memory being configurable for storing data utilized by the at least one processor; and circuitry operative to receive a packet stream and to detect whether the packet stream comprises the data packets of the prescribed data type based on a traffic pattern analysis of the packet stream;

wherein the minimum transit latency is imposed only on a specified percentage of the data packets of the prescribed data type, said specified percentage of the data packets of the prescribed data type being less than all of the data packets of the prescribed data type.

11. The integrated circuit of claim 10, wherein the at least one processor, in conjunction with the step of determining the elapsed time since arrival of the received data packet, is operative to determine an arrival time of the received data packet, the elapsed time being determined relative to the arrival time of the data packet.

12. The integrated circuit of claim 10, wherein the at least one processor, in conjunction with the step of waiting an amount of time at least equal to the difference between the elapsed time and the prescribed minimum transit latency, is operative to store the received data packet at least until the elapsed time since the arrival of the data packet is equal to or greater than the minimum transit latency.

13. The integrated circuit of claim 10, wherein the circuitry comprises:
a measurement circuit operative to receive a packet stream, to measure one or more traffic pattern characteristics of the packet stream in accordance with criteria supplied to the measurement circuit, and to generate an output indicative of respective values of the one or more measured traffic pattern characteristics; and
a comparator coupled to the measurement circuit, the comparator being operative to compare the output generated by the measurement circuit with corresponding expected values of the one or more measured traffic pattern characteristics associated with the prescribed data type, and to generate an output characterizing whether the packet stream comprises data packets of the prescribed data type as a function of whether the output generated by the measurement circuit substantially matches the corresponding expected values of the one or more measured traffic pattern characteristics associated with the prescribed data type.

14. The integrated circuit of claim 10, wherein the criteria supplied to the measurement circuit is based at least in part on a statistical analysis of data traffic patterns of the prescribed data type.

15. The integrated circuit of claim 10, wherein the criteria supplied to the measurement circuit comprises at least one of a distribution of packet sizes, inter-packet delay distribution, and bit rate.

16. A network-based system configurable for identifying Voice over Internet Protocol (VoIP) data packets from a packet stream including a plurality of data packets of potentially different data types, the system comprising:

a measurement circuit operative to receive a packet stream, to measure one or more traffic pattern characteristics of the packet stream in accordance with traffic pattern criteria supplied to the measurement circuit, and to generate an output indicative of respective values of the one or more measured traffic pattern characteristics;

a comparator coupled to the measurement circuit, the comparator being operative to compare the output generated by the measurement circuit with corresponding expected values of the one or more measured traffic pattern characteristics associated with VoIP data packets, and to generate an output characterizing whether the packet stream comprises VoIP data packets as a function of whether the output generated by the measurement circuit substantially matches the corresponding expected values of the one or more measured traffic pattern characteristics associated with VoIP data packets; and at least one processor operative: (i) to receive a VoIP data packet from the data stream; (ii) to determine an elapsed time since an arrival of the received VoIP data packet at the system; (iii) when the elapsed time is equal to or greater than a prescribed minimum transit latency, to transmit the VoIP data packet; and (iv) when the elapsed time is less than the minimum transit latency, to wait an amount of time at least equal to a difference between the elapsed time and the minimum transit latency and then to transmit the VoIP data packet;

wherein the minimum transit latency is imposed only on a specified percentage of the VoIP data packets, said specified percentage of the VoIP data packets being less than all of the VoIP data packets.

* * * * *